SLIDE PROJECTOR USING A BOX OR CIRCULAR SLIDE MAGAZINE

Original Filed March 1, 1963

INVENTOR.
Walter J. Hall,
BY
Cromwell, Greist & Warden
Attys

SLIDE PROJECTOR USING A BOX OR CIRCULAR SLIDE MAGAZINE

Original Filed March 1, 1963

INVENTOR.
Walter J. Hall,
BY
Cromwell, Greist & Warden
Attys.

SLIDE PROJECTOR USING A BOX OR CIRCULAR SLIDE MAGAZINE

Original Filed March 1, 1963

INVENTOR.
Walter J. Hall,
BY
Cromwell, Greist & Warden
Attys

SLIDE PROJECTOR USING A BOX OR CIRCULAR SLIDE MAGAZINE

Original Filed March 1, 1963

INVENTOR.
Walter J. Hall,
BY
Cromwell, Greist & Warden
Attys

SLIDE PROJECTOR USING A BOX OR CIRCULAR SLIDE MAGAZINE

Original Filed March 1, 1963

INVENTOR.
Walter J. Hall.
BY
Cromwell, Greist & Warden
Attys

United States Patent Office

Re. 26,619
Reissued July 1, 1969

26,619
SLIDE PROJECTOR USING A BOX OR CIRCULAR SLIDE MAGAZINE

Walter J. Hall, Chicago, Ill., assignor, by mesne assignments, to GAF Corporation, a corporation of Delaware Original No. 3,209,647, dated Oct. 5, 1965, Ser. No. 262,098, Mar. 1, 1963. Application for reissue Oct. 3, 1967, Ser. No. 675,262

Int. Cl. G03b *23/00*

U.S. Cl. 353—117 28 Claims

Matter enclosed in heavy brackets [ ] appears in the original patent but forms no part of this reissue specification; matter printed in italics indicates the additions made by reissue.

*ABSTRACT OF THE DISCLOSURE*

*A projector having a longitudinally extending groove for alternate reception of a box tray and a circular tray. The box tray is supported in the groove by resting on the base of the latter. The circular tray is supported in vertical dispostion by engaging the groove adjacent one side wall of the latter and by engaging a pair of lugs on the other side wall of the groove. These lugs are equally spaced forwardly and rearwardly of the axis of rotation of the tray.*

This invention relates, generally, to innovations and improvements in photographic slide projectors, and more particularly to a slide projector adapted to have either a conventional, elongated box-like, slide magazine or tray or a circular slide tray operatively associated therewith.

As it is known to those skilled in the art, photographic slide trays or magazines are provided in two basic forms: viz., a box-like slide tray adapted to be received in a slide projector for linear slide indexing movement, or a circular slide tray adapted to be received in a slide projector for rotary slide indexing movement. Circular slide trays may be of the type adapted to rotate in either a vertical or horizontal plane. Heretofore, slide projectors have been incapable of accepting and operating with linear and/or rotary slide trays with equal facility.

It is a primary object of this invention to provide a *new and improved* slide projector adapted to have either an elongated box-like slide tray or a circular slide tray operatively associated therewith.

It is another object of the present invention to provide in a slide projector of the type characterized by a housing having, on the exterior thereof, a longitudinally extending slide-tray-receiving groove or channel[, means for alternately supporting] *for reception of* an elongated box-like slide tray, *unique means for supporting* [and] a vertically disposed circular slide tray in said groove.

*Still another object of the present invention is the provision of new and improved means in a slide projector for supporting a circular slide tray in vertical disposition by engaging the latter at its outer periphery.*

A further object of the present invention is to provide in a slide projector of the type characterized by a housing having, on the exterior thereof, a longitudinally extending slide-tray-receiving groove, means for operatively supporting a circular slide tray in said groove in a vertically extending position, which means include protruding means permanently affixed to the projector and shaped and spaced for non-interfering relationship with a box-like slide tray when the latter is operatively supported in the groove.

An even further object of the present invention is to provide a new and improved vertically extending circular slide tray adapted for operative rotation while supported at the periphery thereof and adapted to be stabilized by engagement of an annular hub track thereof with guide track means on a projector.

[It is a still further object of the present invention to provide a circular slide tray having new and improved slide retaining means.]

These and other objects and advantages of the invention will become apparent from the following specification wherein like numerals refer to similar parts throughout.

In the drawings:

FIG. 8a is a fragmentary plan view of one of the spring clip retainer members of the circular slide tray [of this invention], the retainer being shown before the same is bent in arcuate form along the length thereof;

FIG. 8b is a view similar to FIG. 8a showing the other side of one of the spring clip retainer members;

Figure 1:
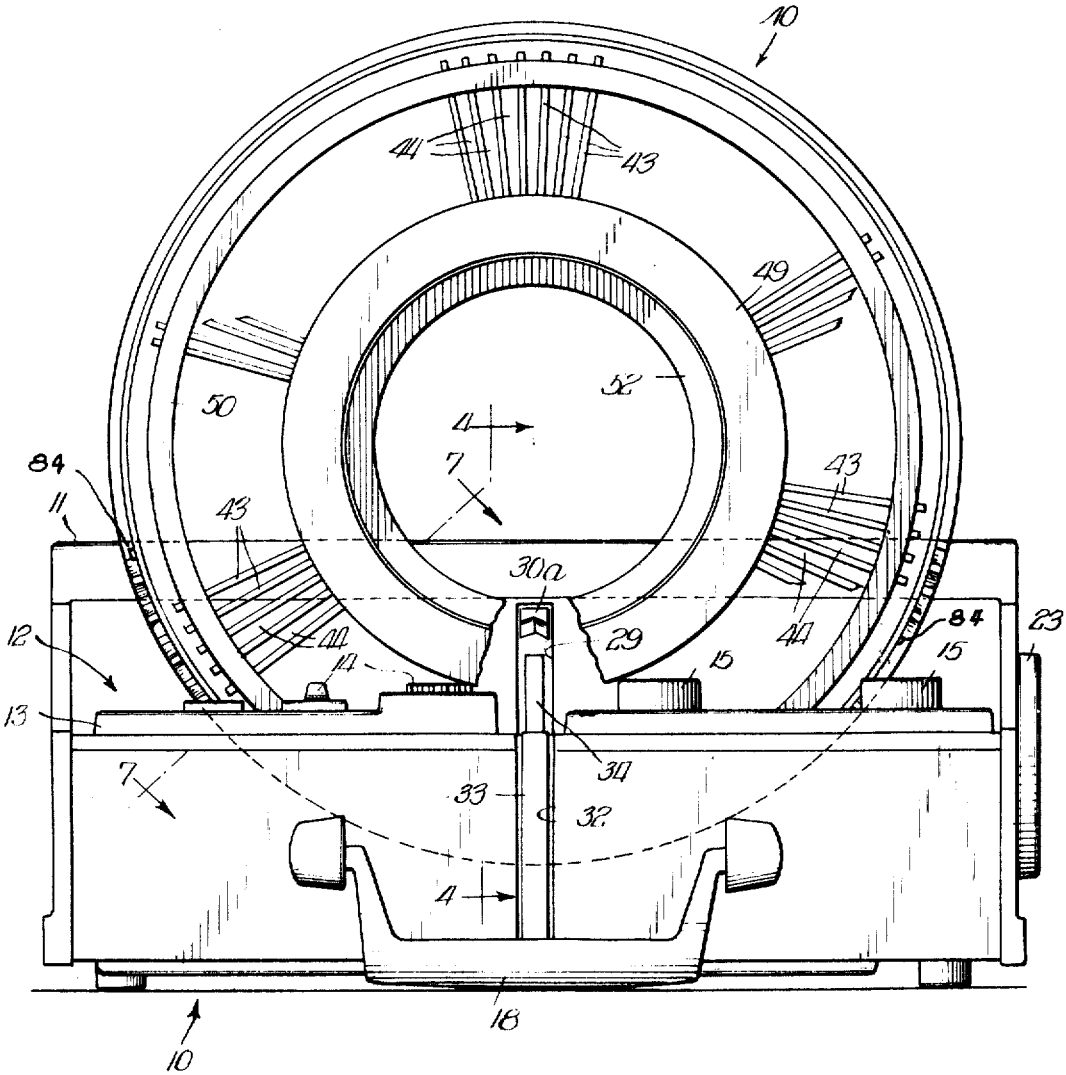
FIG. 1 is an elevational view of a slide projector and circular slide tray illustrating this invention, with a portion of the slide tray being broken away for better illustration of the invention.
Figure 2:
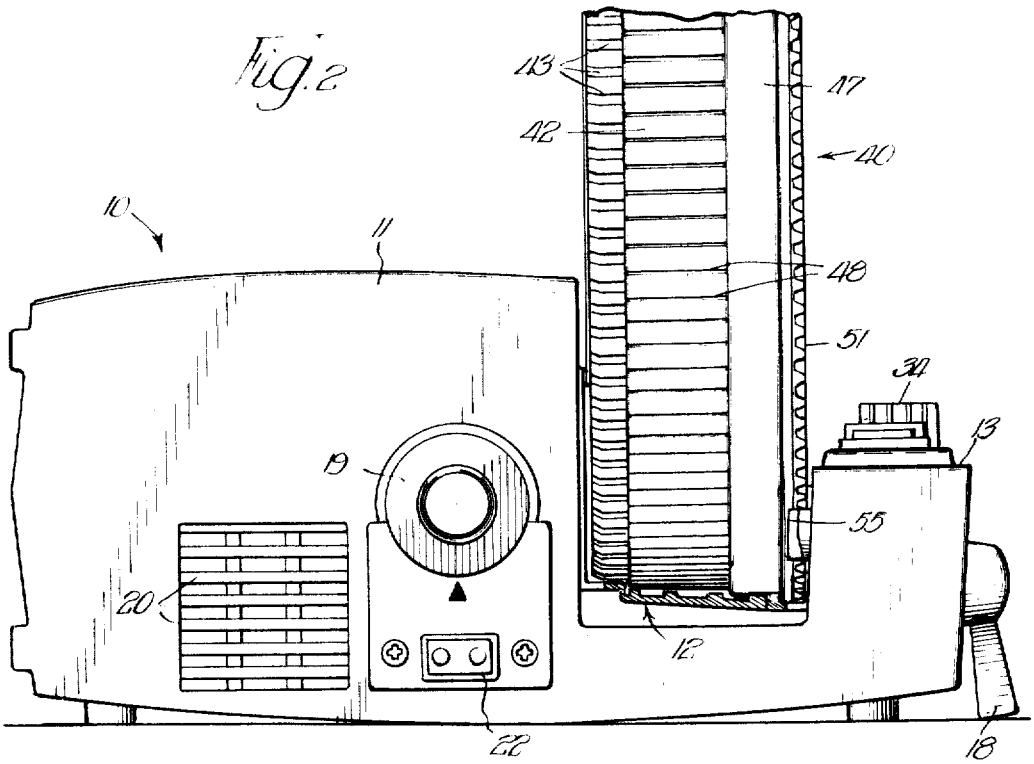
FIG. 2 is a rear elevational view of the slide projector and circular slide tray of FIG. 1.
Figure 3:
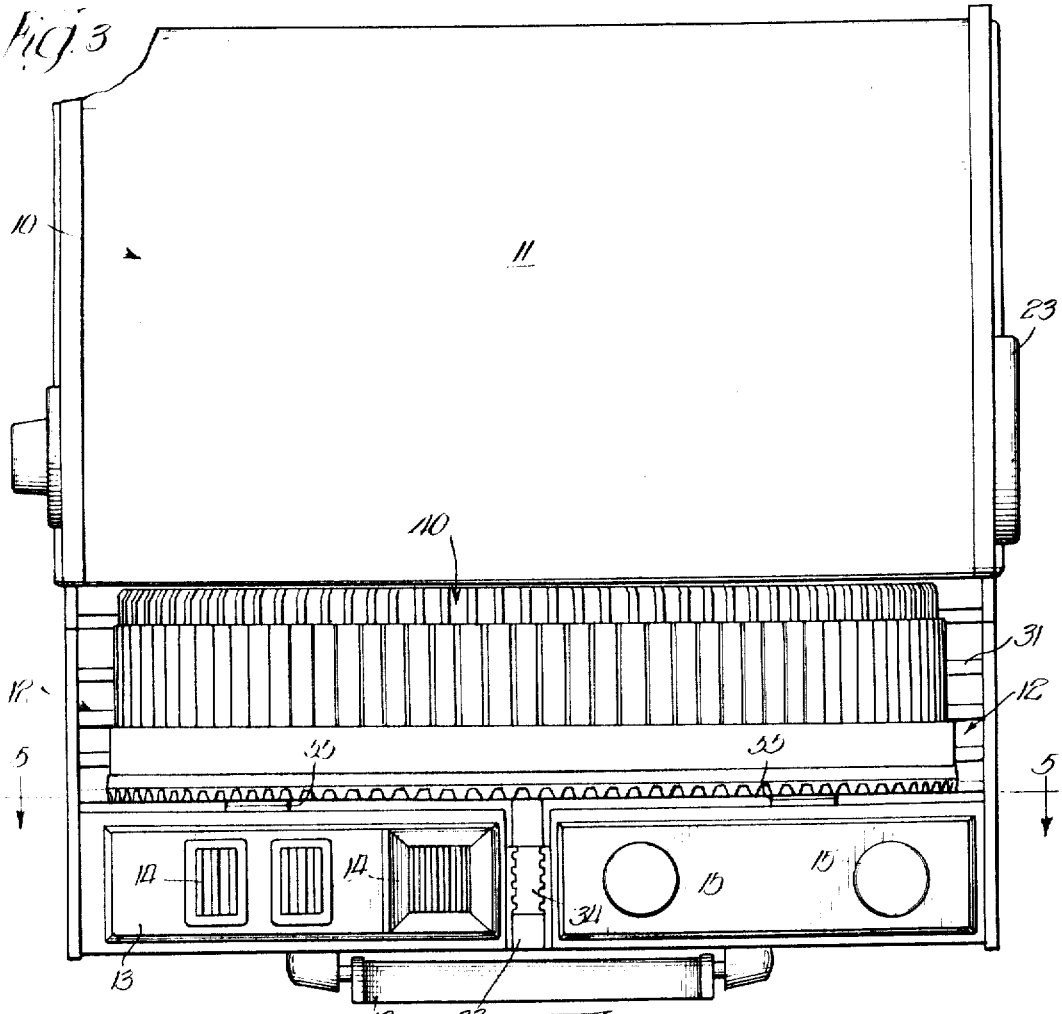
FIG. 3 is a top plan view of the slide projector and circular slide tray of FIG. 1.

FIGS. 1 through 3 show a photographic slide projector, generally designated 10, which projector includes a housing or casing 11 having a longitudinally extending slide-tray-receiving groove, generally designated 12, formed in the exterior thereof. A control panel portion 13 having a number of suitable control buttons 14 and control knobs 15 operably mounted thereon extends along one side of the projector. The projector also includes a carrying handle 18, a snap-on cover (not shown), an on-off-lamp switch 19 (FIG. 2) and louvers 20 through which air may be drawn for cooling the optical system of the slide projector. The casing has an electric socket 22 recessed therein adapted to receive a conventional male plug on the end of an electric cord for applying electric power to the slide projector. The operating components of the slide projector will not be described as they form no part of the present invention. However, it will be understood that the slide projector 10 contains suitable components including a blower, lamp, reflector, and lenses for projecting photographic slides (e.g. 35 mm. slides) through an objective lens supported in an adjustable housing 23 (FIG. 3), which housing is suitably mounted for axial movement within the casing. By way of reference the inner mechanism of the projector may correspond to that shown and disclosed in Brown application, Serial No. 824,877, filed July 3, 1959, now U.S. Patent No. 3,120,150, granted February 4, 1964.

Figure 4:
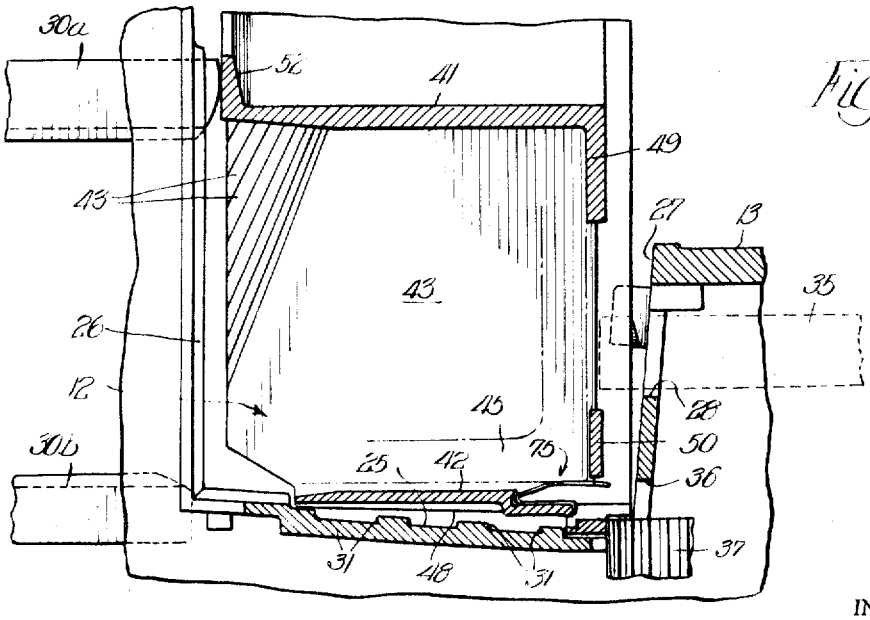
FIG. 4 is an enlarged fragmentary section taken along the line 4—4 of FIG. 1.

As best seen in FIGS. 2 and 4, the slide-tray-receiving groove 12 includes a base or floor 25 and side walls 26 and 27, the latter wall containing an aperture 28 (FIG. 5) at the mid-point thereof. Side wall 26 includes a vertically extending slide-receiving slot 29 at the mid-point thereof, which slot exposes slide receiving means in the form of parallel, horizontally extending upper and lower guide tracks 30a and 30b, respectively. The guide tracks extend at right angles to the groove 12, and the tip of upper guide track 30a extends a short distance through slot 29 into the groove 12. Floor 25 is provided with a plurality of parallel, spaced apart, longitudinally extending ribs 31 for supporting a slide tray in groove 12; the function of ribs 31 will be more fully explained below.

The control panel portion 13 of the slide projector includes a transversely extending recess 32 (FIG. 1) in which is slidably mounted a suitable slide carrier 33 having a handle 34 extending upwardly therefrom. The slide carrier includes a pusher bar 35 (FIG. 4) adapted to extend through aperture 28 in wall 27. It will be understood that the slide carrier is adapted for reciprocal movement in recess 32 for pushing photographic slides by the bar 35 from a slide tray adapted to be received in groove 12 into slot 29 and for returning slides from the slot to the slide tray. Flipper or kicker means (not shown) are provided with the slide carrier for returning a slide to the slide tray.

As seen in FIG. 4, the slide-tray-receiving groove 12 includes an opening 36 in opposed alignment with the slot 29, which opening is formed at the intersection between base 25 and side wall 27. A tray driving pinion 37 operatively associated with the slide carriage 33 and adapted for rotation about a vertical axis has a toothed portion thereof extending through opening 36 and into the groove 12. As will be more fully explained below in connection with the description of the slide trays adapted to be associated with the projector 10, the pinion 37 is adapted to index or rotate in response to movement of slide carriage 33 for indexing of a slide tray received in groove 12.

The circular slide tray [of this invention,] generally designated 40, *which is disclosed and claimed in application Ser. No. 461,574, filed May 3, 1965, as a division of original application Ser. No. 262,098, now Patent No. 3,353,667* will be seen from FIGS. 1 through 3 to be of the vertically disposed type including inner and outer concentric walls 41 and 42, respectively, having a plurality of radially disposed circumferentially spaced partitions or septums 43 extending therebetween. The partitions 43 are closely spaced apart defining a plurality of radially arranged slide receiving spaces or compartments in the circular slide tray. It will be understood that a conventional photographic slide (e.g. 35 mm. transparency mounted in a cardboard slide mount), fragmentarily shown by phantom lines and indicated 45 in FIG. 4, is adapted to be received in each of the slide receiving spaces 44 for movement axially of the circular slide tray into the slot 29 of the projector 10 when the slide tray is operatively supported within the groove 12. The circular slide tray 40 is further characterized by an annular band portion 47 and a plurality of circumferentially spaced apart axially extending ribs 48 formed on the outer surface of the outer wall 42. The circular slide tray, which is preferably molded from a suitable plastic material, includes an outer vertical face characterized by an outwardly extending annular hub flange 49 integral with the inner wall 41, an annular ring 50 secured to each of the partitions 43 and an annular rack formation of teeth 51. The circular slide tray includes an inner face characterized by an inwardly extending annular hub flange 52 integral with the inner wall 41.

The circular slide tray 40 is adapted to be operatively received in vertically extending disposition in the longitudinally extending slide-tray-receiving groove 12 with one of the slide-receiving spaces 44 in alignment with the slide-receiving slot 29. In other words, the circular slide tray [of this invention] is mounted for rotation about its principal axis, i.e., its central longitudinal axis, which axis is parallel to a transverse axis extending through slot 29. As best seen in FIG. 4, when the slide tray 40 is received in groove 12 one of the ribs 48 of the slide tray engages the innermost rib 31 on the base 25 of the groove for establishing a support point between the slide tray and groove. With the circular slide tray 40 in this disposition in groove 12, certain teeth 51 on the slide tray are in meshing engagement with certain teeth of gear 37. Rotation or indexing of gear 37 in response to movement of slide carrier 33 indexes the circular slide tray for positioning one of the adjacent slide receiving spaces 44 in alignment with slot 29, depending upon the direction the pinion gear 37 is driven. However, the circular slide tray 40 is not supported by engagement of teeth 51 and the teeth on gear 37. In addition to the support for the circular slide tray established by transverse engagement of one of the ribs 48 with the innermost rib 31, further means are provided for slidably engaging the periphery of the slide tray adjacent the outer face thereof for operatively supporting the slide tray in the groove 12 and preventing the same from rolling from the groove.

Figure 5:
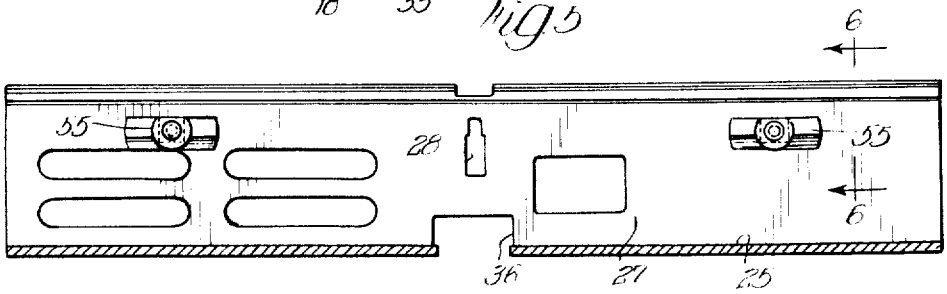
FIG. 5 is a fragmentary section taken along the line 5—5 of FIG. 3 with certain parts of the projector not being shown for better illustration of the invention.
Figure 6:
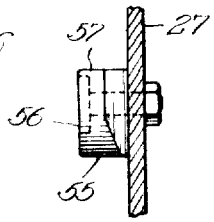
FIG. 6 is an enlarged fragmentary section taken along the line 6—6 of FIG. 5.
Figure 7:
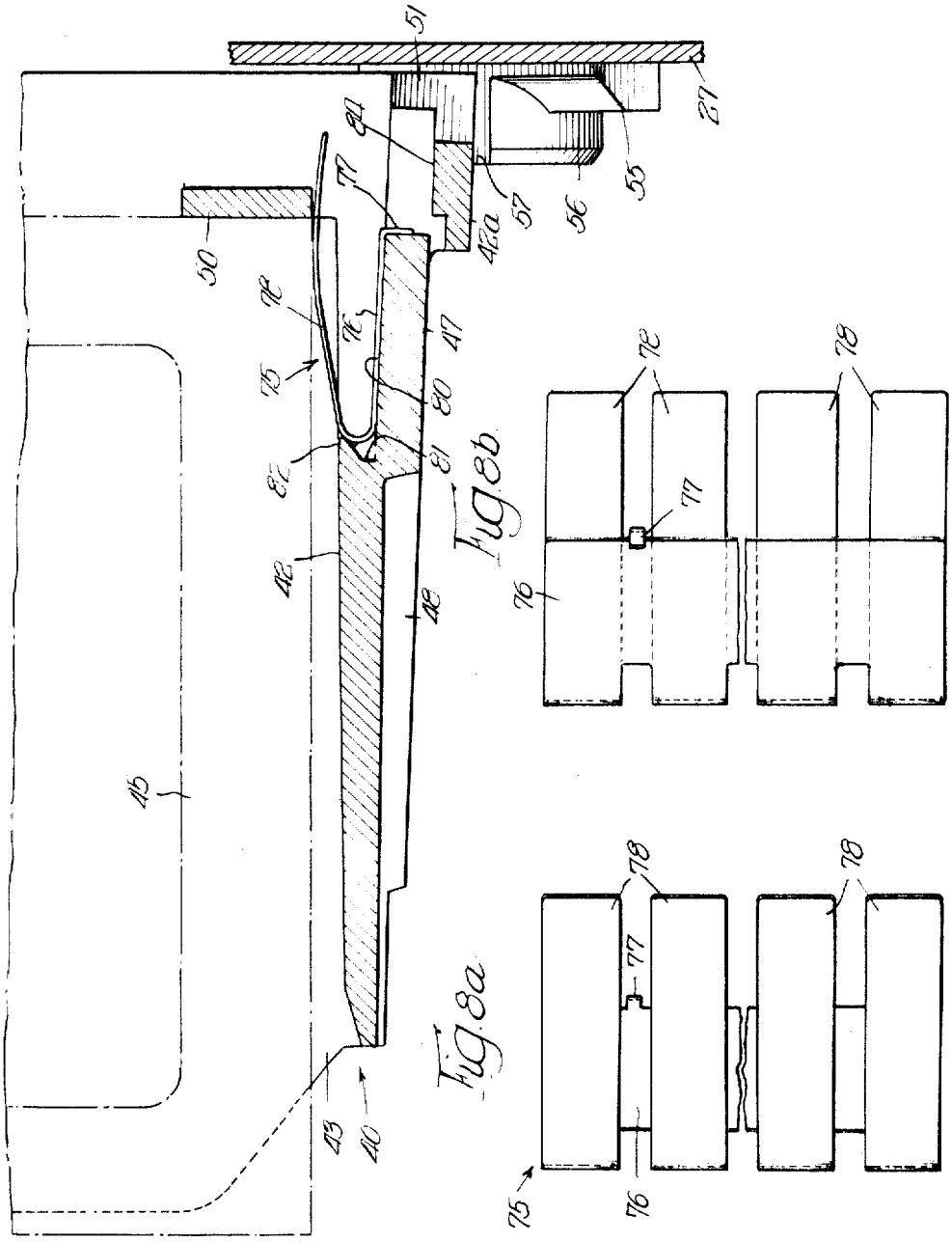
FIG. 7 is an enlarged fragmentary section taken along the line 7—7 of FIG. 1 showing the circular slide tray engaging protruding means mounted in the slide-tray-receiving groove of the projector, with certain parts of the projector not being shown.

As seen in FIGS. 5, 6 and 7, this means is in the form of a pair of lugs or protruding inserts 55, which lugs are bolted or riveted to the side wall 27 of the slide-tray-receiving groove 12 one on each side of the aperture 28. Each lug 55 includes a central rounded hub portion 56 having a flattened top 57. As seen in FIGS. 5 and 7, the lugs 55 are mounted on the side wall 27 for engaging the periphery of the circular slide tray at points on the rounded hub portions 56 just inwardly of the flat portions 57. The protruding inserts or lugs are located on side wall 27 for slidably engaging the periphery of the circular slide tray when the same is operatively positioned in groove 12 with one of the tray spaces 44 in alignment with slot 29. The circular slide tray includes an outer annular rim portion 42a (FIG. 7) adapted for slidable engagement with the hub portions 56 of the lugs.

From the foregoing it is believed to be apparent that the circular slide tray 40 is supported in groove 12 in vertically extending disposition by being contacted at three points on the periphery thereof. One point of contact is established at the periphery of the tray adjacent the inner face thereof by engagement of one of the ribs 48 with the innermost rib 31 of the base 25. The other two points of contact at the periphery of the tray are adjacent the outer face thereof and are established by contact of the annular band portion 42a with the protruding inserts 55. The inserts or lugs 55 are spaced one forwardly and one rearwardly of the principal axis of tray 40 for engaging the periphery of the tray at spaced apart points forwardly and rearwardly of this axis. The lugs position and support the tray for selective alignment of spaces 44 therein with the slot 29 by engagement of the teeth on gear 37 with the teeth 51 on the tray, and the lugs also prevent the circular slide tray from rolling from groove 12. It will be apparent that tray 40 is removably supported in groove 12 and adapted for operable rotation therein by sliding engagement of the peripheral portions of the tray with the protruding inserts 55 and one of the ribs 31. In the preferred form of the invention the slide tray ribs 48 are shown as adapted to engage only one rib 31, i.e., the innermost rib, on the base or floor portion of the groove 12. This single point contact between the periphery of the tray and the groove 12 is not critical. The cross-section of the tray 40 or groove 12 or both may be appropriately varied for allowing ribs 48 to engage other of the ribs 31 in the groove. In this case the other ribs will serve to support the tray so that the teeth 51 thereon will be in mating alignment with the teeth on gear 37, and in this case the lugs 55 function only for aligning the spaces 44 with slot 29 and for preventing the circular slide tray from rolling in the groove 12.

As noted in FIG. 4, the upper guide track 30a projecting through slot 29 in the projector casing is in alignment with an annular planar surface defined by the outside surface of the annular inner hub flange 52 (FIG. 4). During rotation of circular slide tray 40 by gear 37 annular flange 52 intermittently abuts or slides against the end of upper guide track 30a. If the projector is tilted slightly to the side away from the control panel portion 13, the flange 52 will rest continuously against the protruding end of the track 30a. This action serves to stabilize support of slide tray 40 in groove 12.

Figure 9:
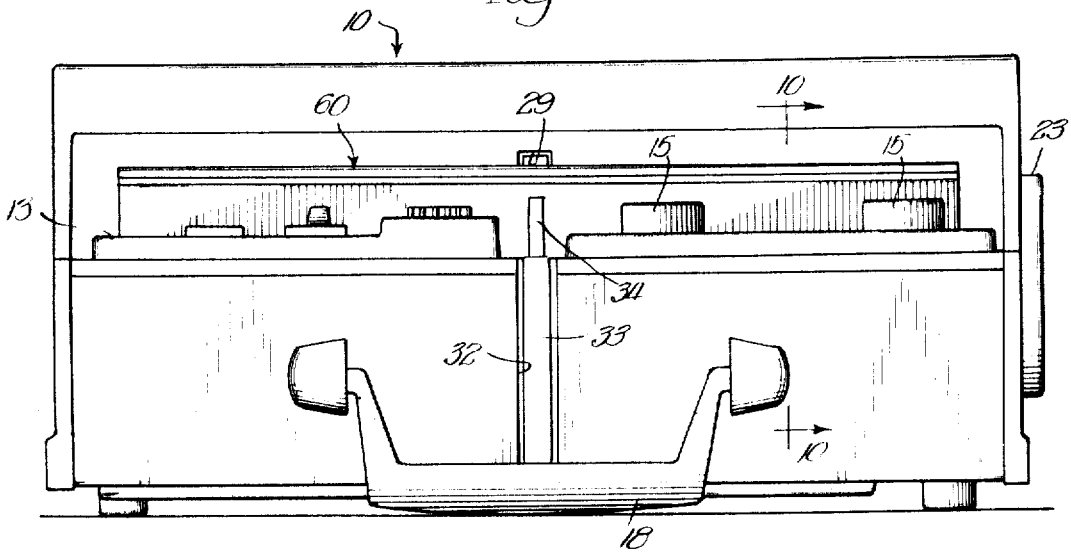
FIG. 9 is a side elevational view of the slide projector of FIG. 1 having a box-like slide tray operably associated therewith.
Figure 10:
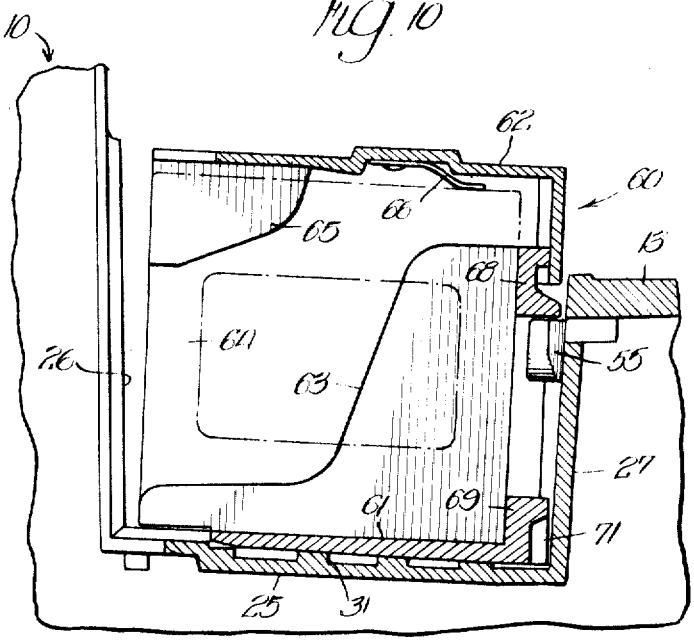
FIG. 10 is a section taken along the line 10—10 of FIG. 9.

FIGS. 9 and 10 show the slide projector 10 having a box-like slide tray, generally designated 60, operatively supported in the slide-tray-receiving groove 12. The slide tray 60, which may be of the type disclosed in the Brown application, Ser. No. 824,877, filed July 3, 1959, *now United States Patent 3,120,150,* includes a base portion having a floor or bottom 61 adapted for sliding engagement with the ribs 31 provided on the base 25 of the groove 12. The slide tray 60 further includes a cover 62 adapted to be removably or hingedly attached to the base portion of the slide tray. The base portion of the slide tray includes end walls (not shown) and a plurality of parallel partitions 63 evenly spaced apart between the end walls. The partitions 63 define a plurality of slide receiving spaces for receiving conventional photographic slides, one of which slides is shown in phantom lines and indicated 64 in FIG. 10. The cover 62 includes a plurality of depending ribs 65 adapted for respective alignment with partitions 63 for further defining the slide receiving spaces in the slide tray 60. The cover 62 also includes a plurality of spring clips 66 attached to the underside thereof, which spring clips are adapted to engage the upper edges of the slides for securely holding the same in place in the slide tray. The outer face of slide tray 60, i.e., the face adjacent groove side wall 27, includes a longitudinally extending opening defined by upper and lower base portions 68, 69 respectively. This open space on the outer face of slide tray 60 allows pusher bar 35 associated with slide carrier 33 to engage the outside edge of one of the slides supported in the slide tray for pushing the slide into slot 29 of the slide projector housing. Lower base portion 69 is provided with a rack of teeth 71 extending along the length thereof, which teeth are adapted to mesh with the teeth on driving pinion 37 for indexing of slide tray 60 by pinion 37. As it will be noted from FIG. 10, the protruding inserts or lugs 55 are located on side wall 27 for non-interfering relation with slide tray 60. More particularly, the flattened portions 57 of the lugs 55 clear the bottom of base portion 68 when slide tray 60 is operatively positioned in groove 12. By this construction it will be apparent that lugs 55, which are located in groove 12 for support of the circular slide tray 40, in no way interfere with the operation of slide tray 60 when the latter is operatively associated with the slide projector. A number of other commercially available, linear or straight slide trays may be used in the groove 12.

It is desirable to provide the circular slide tray 40 with means for preventing photographic slides from falling from the slide receiving spaces therein if the tray is inadvertently tipped during handling of the same. The circular slide tray 40 includes such means in the form of a plurality of detachable spring clip retainers, generally designated 75, which retainers are illustrated in FIGS. 7 and 8. The retainer 75 is generally U-shaped in cross-section and includes a first leg 76 having at least one lug 77 extending at a right angle from one edge thereof (FIGS. 8a and 8b). The other leg of retainer 75 is in the form of a plurality of parallel, spaced-apart spring fingers 78.

As seen in FIG. 7, outer wall 42 of the circular slide tray includes adjacent the outer face thereof an annular portion 80 of greater inside diameter than the inside diameter of the major portion of the outer wall. This portion of the outer wall 42 is separated from the major portion of this wall by an annular shoulder 81, which shoulder is undercut defining an annular lip 82. The annular portion 80 of outer wall 42 includes a plurality of circumferentially spaced-apart, axially extending grooves 84 in the inner surface thereof. The grooves 84 open at one end thereof into teeth 51 on the outer face of the circular slide tray (FIGS. 1 and 7). The spring clip retainer 75 is adapted to be detachably received in the circular slide tray by bending the retainer in arcuate form along the length thereof and by inserting the same between annular ring 50 and annular portion 80. The retainer 75 is pushed into the slide tray (to the left as seen in FIG. 7) until the bight portion of the retainer engages shoulder 81. Axially extending groove 84 is adapted to receive lug 77 as the spring retainer is forced inwardly in the circular slide tray. Engagement of lug 77 in groove 84 aids in detachably securing the retainer in place in the circular slide tray and prevents movement of the retainer along the length thereof relative to the circular slide tray. A single retainer 75 of sufficient length may be provided for extending completely around annular portion 80. In the preferred form of the invention a number of retainers 75 are provided, which retainers are adapted to be bent in arcuate form and mounted in end-to-end relationship in annular portion 80. It will be understood that the retainer or retainers 75 are circumferentially located in the slide tray by engagement of lugs 77 in grooves 84 so that a spring finger 78 is in alignment with each of the slide receiving spaces 44. As noted in FIG. 7, each spring 78 is adapted to engage the inner edge of one of the photographic slides 45 for holding the latter in place in the circular slide tray. The spring fingers prevent inadvertent separation of the slides from the circular slide tray but permit the slides to be easily pushed from the slide receiving spaces or returned thereto by the slide carriage.

Thus it will be seen that this invention provides in a slide projector of the type characterized by a housing having a longitudinally extending slide-tray-receiving groove, means for alternately supporting an elongated box-like slide tray and a circular slide tray in the groove. The protruding inserts or lugs provided in the longitudinally extending groove in the projector for operably supporting the circular slide tray therein do not in any way interfere with the operation of a box-like slide tray when the later is operatively positioned in the groove. It will be realized that it is within the scope of this invention to provide the protruding inserts in other forms or to provide the protruding inserts as an integral part of the side walls defining the groove. In the preferred form of the invention the inserts or lugs 55 as well as the end of guide track 30a are made of a hard and smooth material, such as nylon, to minimize friction between these parts and the periphery of the tray.

It will be realized that this invention provides novel slide projecting means wherein a circular slide tray, elongated box-like slide tray and means on the projector for operatively supporting these trays may be manufactured with ease and at a low cost. Exact tolerances need not be adhered to in the construction of the trays or in the shape of the slide-tray-receiving groove in the projector as the circular slide tray 40 will be operatively supported in groove 12 in vertically extending disposition as long as any three contact or support points are established between the periphery of the tray and the surface of groove 12. As mentioned above, in the preferred embodiment of the invention the three support points are defined by the two protruding inserts or lugs 55 and the innermost rib 31 of base 25. However, in certain instances, e.g., if tray 40 is slightly wider than usual or if guide track 30a extends more than the usual distance into groove 12, circular slide tray 40 may be operatively supported only by engagement of the periphery thereof with both lugs 55 and with the tip of upper guide track 30a. In some instances circular slide tray 40 may be supported by engaging the tip of upper guide track 30a, the pinion gear 37 and one or both of the inserts 55. The circular slide tray is of light weight and symmetrical construction and almost any three point contact between its periphery and groove 12 will serve to support tray 40 operatively in groove 12.

While the invention has been shown in but one form it will be obvious to those skilled in the art that it is not to be so limited, but on the contrary it is susceptible of various changes and modifications without departing from the spirit and scope of the appended claims.

I claim:

1. In a slide projector of the type characterized by a housing having an exterior longitudinally extending slide-tray-receiving groove and a transversely extending slide-receiving slot communicating with the groove, which groove is open at the top and ends thereof for receiving an elongated box-like slide tray, the construction for operatively supporting a circular slide tray in said groove in vertically extending disposition, which circular slide tray has a plurality of radially arranged slide receiving spaces, said construction comprising said circular slide tray and said groove having respective cross-sectional configuration for establishing at least one support point between the outer surface of said slide tray and said groove when the tray is in substantially vertical disposition with one of the slide receiving spaces therein in alignment with said slot, and said construction including protruding means on said housing extending inwardly of said groove, said protruding means being adapted to be slidably engaged by said circular slide tray at points spaced apart on the periphery of the latter, thereby to support removably said circular slide tray at said support point and by said protruding means for rotation about the principal axis of the tray.

2. In a slide projector of the type characterized by a housing having an exterior longitudinally extending slide-tray-receiving groove and a transversely extending slide-receiving slot communicating with the groove, which groove is open at the top and ends thereof for receiving an elongated box-like slide tray, the construction for operatively supporting a circular slide tray in said groove in vertically extending disposition, which circular slide tray has a plurality of radially arranged slide receiving spaces, said construction comprising said circular slide tray and said groove having respective cross-sectional configurations for establishing at least one support point between said circular slide tray and [the base of] said groove adjacent one side wall of the latter when the tray is in substantially vertical disposition with one of the slide receiving spaces therein in alignment with said slot, and said construction including a pair of lugs extending inwardly from the other side wall of said groove, one of the lugs being spaced forwardly of said slot and the other of said lugs being spaced rearwardly of said slot, said lugs being adapted to be slidably engaged by said circular slide tray at points spaced apart on the periphery of the latter thereby to support removably said circular slide tray at said support point and by said lugs for rotation about the principal axis of the tray.

3. The structure according to claim 2 wherein said lugs are [permanently] secured to said other side wall of said groove and shaped and spaced for non-interfering relationship with said box-like slide tray when the latter is operatively supported in said groove.

4. In a slide projector of the type characterized by a housing having an exterior longitudinally extending slide-tray-receiving groove and a transversely extending slide-receiving slot communicating with one side wall of the groove, which groove is open at the top and ends thereof for receiving an elongated box-like slide tray, and which groove includes an opening in the other side wall thereof in alignment with said slot for exposing the teeth of a slide tray driving [pinion] *member,* in combination, a circular slide tray having a plurality of radially arranged slide receiving spaces and a plurality of teeth spaced around the periphery of the tray adjacent one face thereof, said circular slide tray having a cross-sectional configuration cooperating with the surface of said groove for establishing at least one support point between the circular slide tray and [the base of] said groove adjacent said one side wall thereof when the tray is in substantially vertical disposition with one of the slide receiving spaces therein in alignment with said slot and with one of the teeth of the tray in meshing alignment with [one of the teeth of] said [pinion] *driving member,* and a pair of lugs extending inwardly from the other side wall of said groove, one of said lugs being spaced forwardly of said slot and the other of said lugs being spaced rearwardly of said slot, said lugs being adapted to be slidably engaged by said circular slide tray at spaced-apart points on the periphery of the latter, whereby said circular slide tray is removably supported by said groove at said support point and by said lugs for being rotated about the principal axis thereof by said pinion.

5. In a slide projector of the type characterized by a housing having an exterior longitudinally extending slide-tray-receiving groove and a transversely extending vertical slide-receiving slot opening at one side wall of the groove with an upper guide track extending from the upper portion of the slot, which groove is open at the top and ends thereof for receiving an elongated box-like slide tray, in combination, a circular slide tray having a plurality of radially arranged slide receiving spaces and an annular planar surface on the inner face of the tray, said circular slide tray having a cross-sectional configuration cooperating with the surface of said groove for establishing at least one support point between the circular slide tray and the base of said groove adjacent said one side wall thereof when the tray is in substantially vertical disposition with one of the slide receiving spaces therein in alignment with said slot, and protruding means in said groove for engaging said circular slide tray at spaced apart points on the periphery thereof for permitting operative rotation of the circular tray while supporting the latter in the groove, said upper guide track being adapted to be abutted by said annular planar surface during rotation of the circular slide tray whereby said circular slide tray is removably supported by said groove at said support point and by said protruding means and vertically stabilized by said upper guide track for rotation about the principal axis of the tray.

6. In a slide projector of the type characterized by a housing having an exterior longitudinally extending slide-tray-receiving groove and a transversely extending vertical slide-receiving slot opening at one side wall of the groove with an upper guide track extending from the upper portion of the slot, which groove is open at the top and ends thereof for receiving an elongated box-like slide tray, in combination, a circular slide tray having a plurality of radially arranged slide-receiving spaces and an annular planar surface on the inner face of the tray, said planar surface being adapted to be engaged by said upper guide track when one of said slide-receiving spaces is in alignment with said slot, said groove having protruding means therein for engaging said circular slide tray at spaced-apart points on the periphery thereof when one of said slide receiving spaces is in alignment with said slot, said points being spaced forwardly and rearwardly of said slot, whereby said circular slide tray is operatively supported in said groove by engagement of the periphery of the tray with said protruding means and by engagement of said annular planar surface with said upper guide track.

7. In a slide projector of the type characterized by a housing having an exterior longitudinally extending slide-tray-receiving groove and a transversely extending vertical slide-receiving slot opening at one side wall of the groove with an upper guide track extending from the upper portion of the slot, which groove is open at the top and ends thereof for receiving an elongated box-like slide tray, in combination, a circular slide tray having a plurality of radially arranged slide receiving spaces and an annular planar surface on the inner face of the tray, said circular slide tray having a cross-sectional configuration cooperating with the surface of said groove for establishing at least one support point between the circular slide tray and the base of said groove adjacent said one side wall thereof when the tray is in substantially vertical disposition with one of the slide receiving spaces therein in alignment with said slot, and a pair of lugs extending inwardly from the other side wall of said groove, one of the lugs being spaced forwardly of said slot and the other of said lugs being spaced rearwardly of said slot, said lugs being adapted to be slidably engaged by said circular slide tray at spaced apart points on the periphery of the latter, and said upper guide track being adapted to be abutted by said annular planar surface, whereby said circular slide tray is removably supported by said groove at said support point and by said lugs and vertically stabilized by said upper guide track for rotation about the principal axis of the tray.

8. The structure according to claim 7 wherein said lugs are [permanently] secured in said groove and shaped and spaced for non-interfering relationship with said box-like slide tray when the latter is operatively supported in said groove.

9. In a slide projector of the type characterized by a housing having an exterior, longitudinally extending, open top, slide tray receiving groove and a transversely extending slide-receiving slot communicating with the groove, which groove is adapted to receive an elongated box-like slide tray, the construction for supporting a circular slide tray in said groove with the principal axis of the tray extending generally perpendicular with said groove and above the same, which tray includes a plurality of radially arranged slide receiving spaces opening axially of the tray at a common face thereof, said construction including *first and second* means mounted *respectively* adjacent each side of said groove and adapted to engage the circular slide tray for permitting operative rotation of the same about said axis while supporting the latter in the groove for one at a time registration of said spaces with said slot, *said means including members which engage the outer periphery of the tray.*

10. The construction according to claim 9 wherein said *second* means [adjacent one side of said groove] includes a member arranged to engage the circular tray [at a point on the periphery thereof] for supporting the tray against downward vertical movement, and wherein said *first* means [adjacent the other side of the groove] engages the tray for supporting the same against horizontal movement and against downward vertical movement.

11. The construction according to claim 9 wherein said *second* means [adjacent one side of the groove] includes a member arranged to engage the circular slide tray at the lowermost point on the periphery of the tray adjacent the associated face of the same thereby to support the tray against downward vertical movement only, and wherein the *first* means [adjacent the other side of the groove] includes two members arranged to engage the periphery of the tray adjacent the other face of the tray *thereby to establish two additional supporting points,* said *additional* points being at a horizontal level beneath said axis with one of said points being forward of said slot and the other of said points being rearward of said slot.

12. In a slide projector of the type characterized by a housing including a lens system defining the optical axis of the projector, first and second means associated with said housing for supporting a circular slide tray with the longitudinal central axis thereof disposed horizontally and in perpendicular relation with said optical axis, said first means being arranged to engage said tray adjacent one face thereof to support the tray against downward vertical movement, and said second means being arranged to engage said tray *peripherally* adjacent the opposite face thereof for supporting the tray against both horizontal movement and downward vertical movement, said first and second means permitting separation of the tray from the housing by manual upward withdrawal of the former.

13. The construction according to claim 12 wherein said first and second means together constitute a three point supporting system.

14. The construction according to claim 12 wherein said first means engages the tray at a lowermost point on the periphery thereof and wherein said second means includes two members arranged to engage the tray at spaced points on the periphery thereof.

15. In a slide projector of the type characterized by a housing enclosing a lens system defining the optical axis of the projector, the construction comprising said housing having an upwardly opening slide tray receiving groove including generally parallel vertical side walls, first and second means associated with said side walls, respectively, *and substantially disposed within said groove* for supporting a circular slide tray with the longitudinal central axis thereof disposed horizontally and in perpendicular relation with said optical axis and with the lowermost portion of the tray received in the groove, said first means being adapted to engage said tray adjacent the associated face thereof and said second means being adapted to engage said tray adjacent the other face thereof, said first and second means permitting manual upward withdrawal of the tray from the housing.

16. The construction according to claim 15 wherein said first and second means together constitute a three point supporting system for said tray.

17. The construction according to claim 15 wherein said first means engages the tray at a lowermost point on the periphery thereof and wherein said second means includes two members engaging the periphery of the tray at two points disposed beneath the central axis of the tray and forwardly and rearwardly thereof.

18. In combination, a slide projector having a housing including a lens system defining the optical axis of the projector, said housing having an open top slide tray receiving groove, which groove extends along one side of said axis in general parallel relation with the same, said housing further including a slide receiving slot opening into said groove at one side thereof, a circular slide tray having a plurality of radially arranged slide receiving spaces opening at a common face of the tray, means mounted in said groove and engaging said tray for rotatably supporting the latter with one of said spaces in registry with said slot and with the central axis of rotation of the tray arranged horizontally and in perpendicular relation with said optical axis.

19. The combination according to claim 18 wherein said means removably support the tray for manual upward withdrawal from the groove.

20. The combination according to claim 18 wherein said means constitute a three point supporting system for the tray.

21. In combination, a slide projector having a housing enclosing a lens system defining the optical axis of the projector, said housing having an open top slide tray receiving groove, which groove extends along one side of said axis in general parallel relation with the same, said housing further including a slide receiving slot opening into said groove at one side thereof, a circular slide tray having a plurality of radially arranged slide receiving spaces opening at a common face of the tray, first and second means mounted adjacent respective sides of said groove and engaging said tray for rotatably supporting the latter with one of said spaces in registry with said slot and with the central axis of rotation of the tray arranged horizontally and in perpendicular relation with said optical axis, said first and second means permitting separation of the tray from the groove by manual upward withdrawal of the former, *said second means including mem-*

*bers which engage the tray periphery on opposite sides of said slot.*

22. The combination according to claim 21 wherein said first means engages the tray at the periphery thereof adjacent one face of the tray for supporting the same against downward vertical movement, and wherein said *members engage* [second means engages] the periphery of the tray adjacent the other face thereof for supporting the tray against downward movement and against horizontal movement.

23. The combination according to claim 21 wherein said first and second means constitute a three point supporting system for the tray.

*24. The construction according to claim 1 further defined by, said circular slide tray including individual slide retaining means for each of said slide receiving spaces, said retaining means forming an integral part of said circular tray and moving with the latter during rotation thereof.*

*25. The construction according to claim 9 further defined by, said circular slide tray including individual slide retaining means for each of said slide receiving spaces, said retaining means forming an integral part of said circular tray and moving with the latter during rotation thereof.*

*26. The construction according to claim 15 further defined by, said circular slide tray including a plurality of radially arranged slide receiving spaces opening axially of the tray adjacent one face thereof, said circular slide tray including individual slide retaining means for each of said slide receiving spaces, said retaining means forming an integral part of said circular tray and moving with the latter during rotation thereof.*

*27. The combination according to claim 18 further defined by, said circular slide tray including individual slide retaining means for each of said slide receiving spaces, said retaining means forming an integral part of said circular tray and moving with the latter during rotation thereof.*

*28. The combination according to claim 21 further defined by, said circular slide tray including individual slide retaining means for each of said slide receiving spaces, said retaining means forming an integral part of said circular tray and moving with the latter during rotation thereof.*

References Cited

The following references, cited by the Examiner, are of record in the patented file of this patent or the original patent.

UNITED STATES PATENTS

| | | | |
|---|---|---|---|
| 1,328,192 | 1/1920 | Pflaster | 353—107 |
| 1,901,245 | 9/1930 | Jones | 40—70 |
| 1,950,047 | 2/1932 | Contal | 353—85 |
| 2,221,753 | 3/1940 | Bodie | 353—117 |
| 2,748,653 | 6/1956 | Pollan et al. | 353—107 |
| 2,942,365 | 2/1957 | Badalich | 353—116 |
| 3,081,870 | 1/1959 | Plettner | 206—62 |

NORTON ANSHER, *Primary Examiner.*

R. M. SHEER, *Assistant Examiner.*

U.S. Cl. X.R.

353—116